United States Patent
Lin et al.

(10) Patent No.: US 9,905,194 B2
(45) Date of Patent: Feb. 27, 2018

(54) INTEGRATED CIRCUIT FOR DRIVING ADAPTABLE POWER TO DISPLAY AND DISPLAY DEVICE INCLUDING THE SAME

(71) Applicant: SAMSUNG ELECTRONICS CO., LTD., Suwon-si (KR)

(72) Inventors: Chiahsin Lin, Hsinchu (TW); Chih-Yang Liao, Taoyuan (TW); Jaeyeon Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/972,435

(22) Filed: Dec. 17, 2015

(65) Prior Publication Data

US 2016/0260409 A1 Sep. 8, 2016

(30) Foreign Application Priority Data

Mar. 2, 2015 (KR) ........................ 10-2015-0029194

(51) Int. Cl.
*G09G 1/00* (2006.01)
*G09G 5/00* (2006.01)
*H02M 3/07* (2006.01)
*H02M 1/00* (2006.01)

(52) U.S. Cl.
CPC .............. *G09G 5/006* (2013.01); *H02M 3/07* (2013.01); *H02M 3/073* (2013.01); *G09G 2300/0426* (2013.01); *G09G 2310/0289* (2013.01); *G09G 2330/021* (2013.01); *G09G 2380/02* (2013.01); *H02M 2001/0032* (2013.01); *H02M 2003/075* (2013.01); *Y02B 70/16* (2013.01)

(58) Field of Classification Search
CPC .......... G09G 1/005; G09G 2330/00–2330/028
See application file for complete search history.

(56) References Cited

U.S. PATENT DOCUMENTS

| | | | |
|---|---|---|---|
| 5,111,375 A | 5/1992 | Marshall | |
| 6,008,690 A * | 12/1999 | Takeshima | H02M 3/073 327/534 |
| 6,157,242 A | 12/2000 | Fukui | |
| 6,734,475 B2 | 5/2004 | Myono et al. | |
| 7,009,857 B2 | 3/2006 | Chen et al. | |
| 7,323,914 B2 | 1/2008 | Hashimoto | |
| 7,679,430 B2 | 3/2010 | Fort et al. | |
| 8,593,213 B2 | 11/2013 | Neugebauer | |
| 8,598,945 B2 | 12/2013 | Gorisse | |
| 8,674,750 B2 | 3/2014 | Lee | |

(Continued)

FOREIGN PATENT DOCUMENTS

| JP | 3580693 B2 | 10/2004 |
|---|---|---|
| JP | 3670642 B2 | 7/2005 |

(Continued)

*Primary Examiner* — Sanghyuk Park
(74) *Attorney, Agent, or Firm* — Sughrue Mion, PLLC

(57) ABSTRACT

A display driving integrated circuit is provided which drives a plurality of gate lines included in a display panel. The display driving integrated circuit includes: a charge pump configured to change a voltage from an external power source to generate an output voltage; and a gate line driver configured to drive the plurality of gate lines based on the output voltage. The charge pump may operate in one of a low-current mode and a high-current mode based on a size of the display panel.

20 Claims, 15 Drawing Sheets

(56) References Cited

U.S. PATENT DOCUMENTS

| | | | |
|---|---|---|---|
| 2002/0105021 A1 | 8/2002 | Myono et al. | |
| 2005/0174815 A1 | 8/2005 | Chen et al. | |
| 2006/0044052 A1 | 3/2006 | Hashimoto | |
| 2007/0262757 A1* | 11/2007 | Kawagoshi | H02M 1/10 323/265 |
| 2009/0153232 A1 | 6/2009 | Fort et al. | |
| 2011/0234652 A1 | 9/2011 | Lee | |
| 2011/0309877 A1 | 12/2011 | Gorisse | |
| 2012/0249223 A1 | 10/2012 | Neugebauer | |
| 2013/0057530 A1* | 3/2013 | Han | G09G 3/3696 345/211 |
| 2014/0003609 A1 | 1/2014 | Rombach et al. | |

FOREIGN PATENT DOCUMENTS

| | | |
|---|---|---|
| KR | 100671911 B1 | 1/2007 |
| KR | 1020110106686 A | 9/2011 |

\* cited by examiner

INTEGRATED CIRCUIT FOR DRIVING ADAPTABLE POWER TO DISPLAY AND DISPLAY DEVICE INCLUDING THE SAME

CROSS-REFERENCE TO THE RELATED APPLICATION

The present application claims priority from Korean Patent Application No. 10-2015-0029194 filed on Mar. 2, 2015, in the Korean Intellectual Property Office, the entire contents of which are hereby incorporated by reference.

BACKGROUND

Apparatuses and methods consistent with exemplary embodiments of the inventive concept described herein relate to a display device, and more particularly, relate to a display driving integrated circuit and a display device including the same.

A display device outputs a digital signal including image information as an image that a user can watch through a display panel. With the development of display technology, flat panel displays (FPDs) such as a plasma display panel (PDP), a field emission display (FED), an electroluminescent display (ELD), a light emitting diode (LED), and a vacuum fluorescent display (VFD) may be used in various fields such as a portable terminal, a digital camera, and a mobile device.

A display driving integrated circuit (DDI) is used to drive a display device. The DDI generates various driving voltages, needed to drive the display device, using input voltages. In general, since levels of the driving voltages are higher than those of the input voltages, the driving voltages are generated using a charge pump. A related art charge pump has a characteristic in which an output voltage decreases as a driving current of the display device increases. For this reason, if a level of the driving current of the display device is over a predetermined level, a charge pump with another structure is required. Thus, a driving characteristic of the charge pump causes an increase in manufacturing costs and makes it difficult to manufacture the charge pump.

SUMMARY exemplary embodiments of the inventive concepts provide a display driving integrated circuit (DDI) including a single structure of charge pump having a wide current driving capacity and a display device including the DDI.

According to an aspect of exemplary embodiments, there is provided a DDI which drives a plurality of gate lines included in a display panel. The DDI may include: a charge pump configured to boost a voltage from an external power source to generate an output voltage; and a gate line driver configured to drive the plurality of gate lines based on the output voltage. The charge pump may operate in one of a low-current mode and a high-current mode based on a size of the display panel.

The DDI may further include a signal generator configured to generate a first switching signal and a second switching signal a phase of which is opposite to a phase of the second switching signal. The charge pump may generate the output voltage in response to the first and second switching signals.

The charge pump may include: a mode switch configured to operate in response to the first and second switching signals; a control switch configured to operate in response to the first and second switching signals; and an output circuit configured to output the output voltage based on operations of the mode switch and the control switch. The mode switch is enabled or disabled according to the low-current mode or the high-current mode.

The output circuit may include first, second, and third diodes and first, second, and third capacitors. An input terminal of the first diode may receive a first voltage from the external power source and an output terminal thereof may be connected to an input terminal of the second diode. An output terminal of the second diode may be connected to an input terminal of the third diode. An output terminal of the third diode may be connected to a first node for outputting the output voltage. One end of the first capacitor may be connected to the output terminal of the first diode and the mode switch and the other end thereof may be connected to the control switch. One end of the second capacitor may be connected to the output terminal of the second diode and the mode switch and the other end thereof may be connected to the control switch. One end of the third capacitor may be connected to the first node and the other end thereof is grounded.

Each of the first and second capacitors may be connected to the mode switch and the control switch through at least one transparent electrode.

The control switch may include first and third control switches operating in response to the first switching signal and second and fourth control switches operating in response to the second switching signal. An input terminal of the first control switch may receive a third voltage from the external power source and an output terminal thereof may be connected to the other end of the first capacitor. An input terminal of the second control switch may receive the first voltage and an output terminal thereof may be connected to the other end of the first capacitor. An input terminal of the third control switch may receive the first voltage and an output terminal thereof may be connected to the other end of the second capacitor. An input terminal of the fourth control switch may receive a second voltage from the external power and an output terminal thereof may be connected to the other end of the second capacitor.

The mode switch may include first and third mode switches operating in response to the first switching signal and a second mode switch operating in response to the second switching signal. An input terminal of the first mode switch may receive the first voltage and an output terminal thereof may be connected to the one end of the first capacitor and an input terminal of the second mode switch. An output terminal of the second mode switch may be connected to the one end of the second capacitor and an input terminal of the third mode switch. An output terminal of the third mode switch may be connected to the first node.

The first to third mode switches may be disabled when the charge pump operates in the high-current mode and may be enabled when the charge pump operates in the low-current mode.

The charge pump may operate in the high-current mode when a level of a driving current of the display panel is higher than a predetermined level and may operate in the low-current mode when a level of the driving current of the display panel is lower than the predetermined level.

The DDI may further include a plurality of data line drivers configured to drive a plurality of data lines included in the display panel; and a logic circuit configured to control the gate line driver and the plurality of data line drivers according to a control of an external device.

According to another aspect of an exemplary embodiment, there is provided a display device which may include: the above DDI; the above display panel including the plurality of gate lines, a plurality of data lines, and a plurality of pixels connected to the plurality of gate lines and the plurality of data lines; and a flexible printed circuit connected to the DDI through a plurality of transparent electrodes provided on the display panel and including an output circuit configured to provide the DDI with a driving voltage, wherein the DDI includes a mode switch and a control switch that operate in one of a low-current mode and a high-current mode according to a size of the display panel and control the output portion.

The mode switch may be disabled in the low-current mode and may be enabled in the high-current mode.

The output circuit may include first, second, and third diodes and first, second, and third capacitors. An input terminal of the first diode may receive a first voltage and an output terminal thereof may be connected to an input terminal of the second diode. An output terminal of the second diode may be connected to an input terminal of the third diode. An output terminal of the third diode may be connected to a first node for outputting the output voltage. One end of the first capacitor may be connected to the output terminal of the first diode and may be connected to the mode switch through one of the plurality of transparent electrodes and the other end thereof may be connected to the control switch. One end of the second capacitor may be connected to the output terminal of the second diode and may be connected to the mode switch through one of the plurality of transparent electrodes and the other end thereof may be connected to the control switch. One end of the third capacitor may be connected to the first node and the other end thereof is grounded.

The mode switch may include first and third mode switches operating in response to the first switching signal and a second mode switch operating in response to the second switching signal. An input terminal of the first mode switch may receive the first voltage and an output terminal thereof may be connected to the one end of the first capacitor and an input terminal of the second mode switch. An output terminal of the second mode switch may be connected to an input terminal of the third mode switch and with the one end of the second capacitor through one of the plurality of transparent electrodes. An output terminal of the third mode switch may be connected to the first node through one of the plurality of transparent electrodes.

The control switch may include first and third control switches operating in response to the first switching signal and second and fourth control switches operating in response to the second switching signal. An input terminal of the first control switch may receive a third voltage and an output terminal thereof may be connected to the other end of the first capacitor through one of the plurality of transparent electrodes. An input terminal of the second control switch may receive the first voltage and an output terminal thereof may be connected to the other end of the first capacitor through one of the plurality of transparent electrodes. An input terminal of the third control switch may receive the first voltage and an output terminal thereof may be connected to the other end of the second capacitor through one of the plurality of transparent electrodes. An input terminal of the fourth control switch may receive the second voltage and an output terminal thereof may be connected to the other end of the second capacitor through one of the plurality of transparent electrodes.

The first voltage may be a positive voltage, the second voltage may be a negative voltage, the third voltage may be a ground voltage, and the driving voltage may be a voltage higher than the first voltage.

The DDI may further include a gate line driver configured to control the plurality of gate lines, respectively; a data line driver configured to control the plurality of data lines, respectively; and a logic circuit configured to control the gate line driver and the data line driver.

According to still another aspect of an exemplary embodiment, there is provided a DDI which may include a charge pump comprising at least one switch and at least one capacitor. Here, the charge pump may be configured to change a given voltage to generate an output voltage provided to a driver of a display panel, according to a mode of the display panel, wherein the mode of the display panel comprises a low-current mode and a high-current mode which is determined by an amount of current required to drive the display panel.

The charge pump may be configured to receive a first switching signal and a second switching signal a phase of which is opposite to a phase of the first switching signal, and generate the output voltage in response to the first and second switching signals, and may be further configured to charge the given voltage during a first time period and increase the given voltage to the output voltage during a second time period.

The given voltage may be a voltage charged in the at least one capacitor, and may be lower than an input voltage provided from an outside power source by an amount of a voltage dropped by a parasitic resistance of the display panel.

Here, in either of the low-current mode and the high-current mode, the charge pump may configured to use the same at least one switch and the same at least one capacitor to generate the output voltage, thereby reducing the manufacturing costs of the charge pump regardless of the mode of the display panel.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF THE EXEMPLARY EMBODIMENTS

Figure 1:
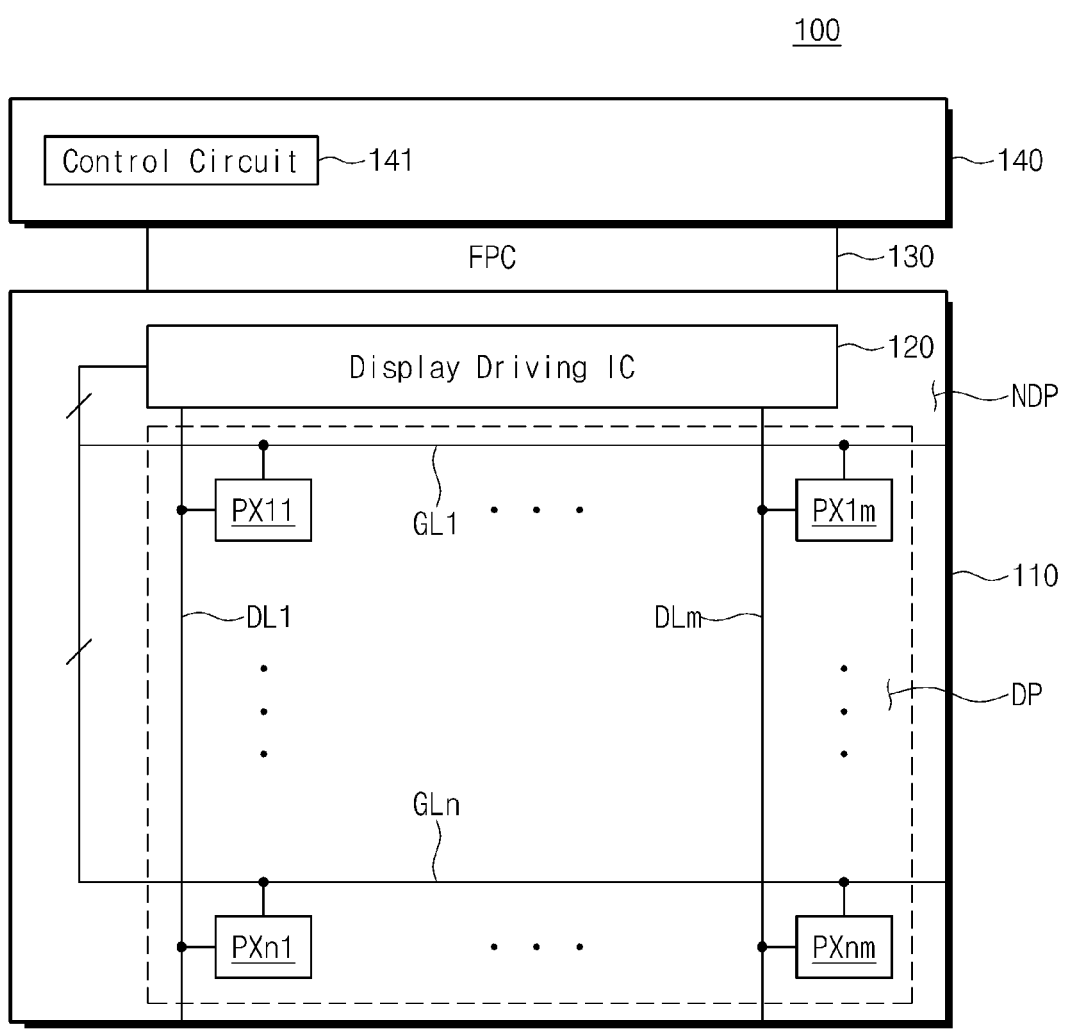
FIG. 1 is a diagram schematically illustrating a display device according to an exemplary embodiment.

Detailed exemplary embodiments of the inventive concepts are disclosed herein. However, specific structural and functional details disclosed herein are merely representative for purposes of describing exemplary embodiments of the inventive concepts. Exemplary embodiments of the inventive concepts may, however, be embodied in many alternate forms and should not be construed as limited to only the embodiments set forth herein.

Accordingly, exemplary embodiments of the inventive concepts are capable of various modifications and alternative forms. It should be understood, however, that there is no intent to limit the inventive concepts to the particular forms disclosed, but to the contrary, exemplary embodiments of the inventive concepts are to cover all modifications, equivalents, and alternatives falling within the scope of the inventive concepts Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of exemplary embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display driving integrated circuit according to an exemplary embodiment of the inventive concept may contain a charge pump that outputs a high voltage (e.g., a gate voltage, a driving voltage, and so on). The charge pump may operate in any one of a low-current mode and a high-current mode, based on a driving current required by a display panel or the size of the display panel. This may permit the display driving integrated circuit to have a wide current driving capacity, thereby reducing manufacturing costs of the display driving integrated circuit and improving performance.

Figure 2:
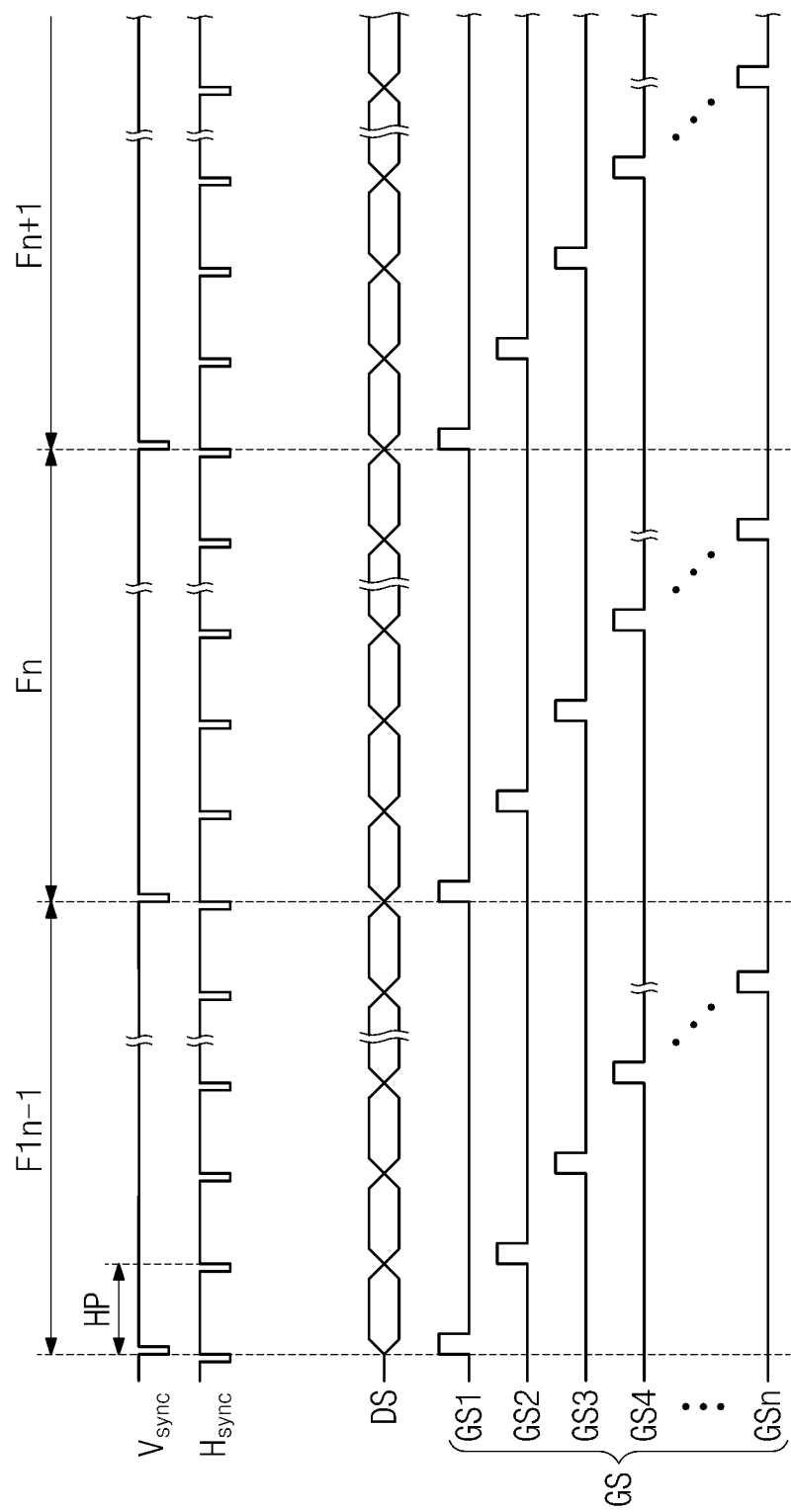
FIG. 2 is a timing diagram of signals used in a display panel of FIG. 1, according to an exemplary embodiment.

FIG. 1 is a diagram schematically illustrating a display device according to an exemplary embodiment. FIG. 2 is a timing diagram of signals used in a display panel of FIG. 1. Referring to FIGS. 1 and 2, a display device 100 includes a display panel 110, a display driving integrated circuit (DDI) 120, a flexible printed circuit (FPC) 130, and a main circuit substrate 140.

The display panel 110 may be implemented by at least one of various display panels such as a liquid crystal display panel, an organic light emitting display panel, an electrophoretic display panel, and an electrowetting display panel.

Below, it is assumed for the sake of easy description that the display panel 110 is the liquid crystal display panel. However, the scope and spirit of the inventive concept may not be limited thereto. For example, the display panel 110 according to an exemplary embodiment may be implemented by the above-described display panels or other display panels. In exemplary embodiments, a liquid crystal display panel may further include a polarizer (not shown), a backlight unit (not shown), and so on.

A plane of the display panel 110 is divided into a display area DP where a plurality of pixels PX11 to PXnm are disposed and a non-display area NDP surrounding the display area DP. The display panel 110 includes a plurality of gate lines GL1 to GLn and a plurality of data lines DL1 to DLn. The gate lines GL1 to GLn and the data lines DL1 to DLn are disposed to intersect one another. The gate lines GL1 to GLn and the data lines DL1 to DLn are connected to the DDI 120 and are driven according to a control of the DDI 120.

Each of the pixels PX11 to PXnm is connected to a corresponding one of the gate lines GL1 to GLn and a corresponding one of the data lines DL1 to DLn. The pixels PX11 to PXnm may be classified according to a color to be displayed. The pixels PX11 to PXnm may display one of primary colors. The primary colors may include red, green, blue, and white. However, the scope and spirit of the inventive concept may not be limited thereto. For example, the primary colors may further include different colors such as include yellow, cyan, magenta, and so on.

In exemplary embodiments, although not shown, the display panel 110 may further include a dummy gate line disposed on the non-display area NDP. In exemplary embodiments, the dummy gate line may not be connected to pixels. The dummy gate line may be connected to the DDI 120.

The DDI 120 is connected to the gate lines GL1 to GLn and the data lines DL1 to DLm, and drives the gate lines GL1 to GLn and the data lines DL1 to DLm. The DDI 120 receives image data and control signals from a control circuit 141, which is included in the substrate 140, through the FPC 130. In exemplary embodiments, the control signals may include the following signals: a vertical synchronization signal Vsync, a horizontal synchronization signal Hsync, a data enable signal, and a clock signal.

The vertical synchronization signal Vsync is a signal for discriminating frame periods Fn−1, Fn, and Fn+1. The horizontal synchronization signal Hsync is a signal for discriminating horizontal periods HP, that is, a row discrimination signal. The data enable signal is a signal for indicating a section in which data is input, and has a high level only during a period where data is output. The clock signal is a signal that is toggled every constant period interval.

During the frame periods Fn−1, Fn, and Fn+1, the DDI 120 generates gate signals GS 1 to GSn and outputs them to the gate lines GL1 to GLn. The gate signals GS 1 to GSn may be sequentially output to correspond to the horizontal periods HP. The DDI 120 generates gray scale voltages based on image data. The DDI 120 provides the data lines DL1 to DLm with the gray scale voltages as data voltages DS.

The data voltages DS may include positive data voltages having positive values and/or negative data voltages having negative values on the basis of a common voltage. A portion of data voltages to be applied to the data lines DL1 to DLm during each horizontal period HP may be positive, and the rest thereof may be negative. A polarity of each data voltage DS may be inverted according to the frame periods Fn−1, Fn, and Fn+1 to prevent deterioration of liquid crystals. The DDI 120 generates data voltages, which are inverted by frame period, in response to an inversion signal.

In exemplary embodiments, the DDI 120 may be disposed on the non-display area NDP of the display panel 110. In exemplary embodiments, the DDI 120 may be provided on the non-display area NDP of the display panel 110 in a chip on glass (COG) manner. The DDI 120 receives signals from the control circuit 141, included in the substrate 140, through the FPC 130. Also, the DDI 120 may receive a plurality of voltages from the FPC 130, the substrate 140, or an external power driving circuit (not shown), and may generate various voltages for driving the gate lines GL1 to GLn and the data lines DL1 to DLm based on the received voltages. In exemplary embodiments, the DDI 120 may be connected to the FPC 130 through a transparent electrode ITO (Indium Thin Oxide) formed on the display panel 110.

Figure 3:
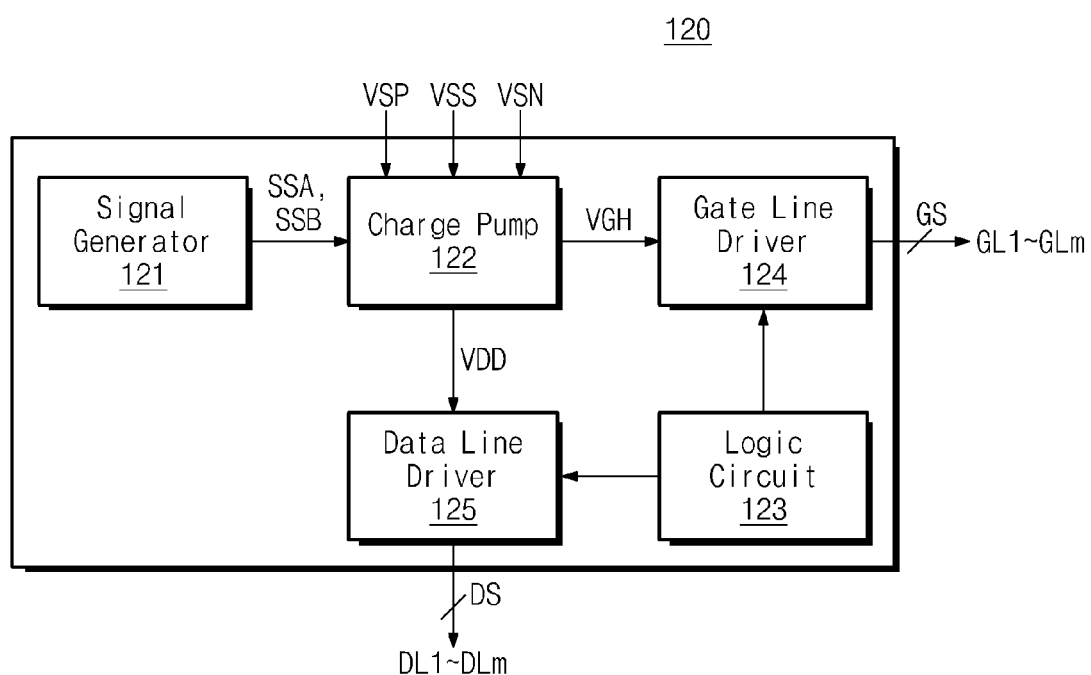
FIG. 3 is a block diagram schematically illustrating a display driving integrated circuit of FIG. 1, according to an exemplary embodiment.

FIG. 3 is a block diagram schematically illustrating the DDI of FIG. 1. Referring to FIGS. 1 and 3, the DDI 120 includes a signal generator 121, a charge pump 122, a logic circuit 123, a gate line driver 124, and a data line driver 125.

The signal generator 121 generates first and second switching signals SSA and SSB that the charge pump 122 uses. In exemplary embodiments, the first and second switching signals SSA and SSB may be complementary. Phases of the first and second switching signals SSA and SSB may be opposite to each other.

The charge pump 122 receives first, second, and third voltages VSP, VSN, and VSS. The charge pump 122 generates various voltages needed to drive the DDI 120 based on the first, second, and third voltages VSP, VSN, and VSS and the first and second switching signals SSA and SSB. For example, the charge pump 122 responds to the first and second switching signals SSA and SSB to generate a high voltage VGH based on the first, second, and third voltages VSP, VSN, and VSS. In detail, the charge pump 122 boosts the first, second, and third voltages VSP, VSN, and VSS in response to the first and second switching signals SSA and SSB to generate the high voltage VGH. In exemplary embodiments, the high voltage VGH may be about 15 V. The high voltage VGH thus generated is provided to the gate line driver 124. In exemplary embodiments, the high voltage VGH may be a driving voltage of the gate line driver 124. In exemplary embodiments, the first voltage VSP, the second voltage VSN, and the third voltage VSN may be 5 V, −5 V, and a ground voltage, respectively. In exemplary embodiments, the first, second, and third voltages VSP, VSN, and VSS may be provided from a power management chip (PMIC) (not shown) provided on a flexible printed circuit 120 or from any other power supply device.

The logic circuit 123 receives image data and a control signal from the control circuit 141 (refer to FIG. 1). The logic circuit 123 controls the gate line driver 124 and the data line driver 125 in response to input signals. The gate line driver 124 provides the gate lines GL1 to GLn with corresponding gate signals GS according to a control of the logic circuit 123. The data line driver 125 provides data lines DL1 to DLm with corresponding the data signals DS according to a control of the logic circuit 123.

In exemplary embodiments, as the size of a display panel 110 increases, lengths of the gate lines GL1 to GLn and the data lines DL1 to DLm included in the display panel 110 may also become long. If the lengths of the gate lines GL1 to GLn and the data lines DL1 to DLm become long, a driving current needed to drive each line may increase. Also, a voltage level higher than a constant voltage level is required for the DDI 120 to drive the gate lines GL1 to GLn and the data lines DL1 to DLm. That is, the charge pump 122 of the DDI 120 must satisfy requirements on a driving current and an output voltage according to the size of a display panel. However, in case of a related charge pump, as the driving current increases, the output voltage is reduced. For this reason, to satisfy a condition of the output voltage (or the driving voltage) when the driving current increases, a charge pump having another structure may be manufactured, or a separate power device may be used.

The charge pump 122 of the DDI 120 according to the present exemplary embodiment operates in any one of a high-current mode and a low-current mode, based on the size of the display panel 110 (or a required driving current). The amount of driving current when the charge pump 122 operates in the high-current mode may be greater than that when it operates in the low-current mode. That is, since a wide driving current condition is satisfied using a single structure of charge pump 122, a DDI capable of reducing manufacturing costs and improving performance and a display device including this DDI can be provided.

Figure 4:
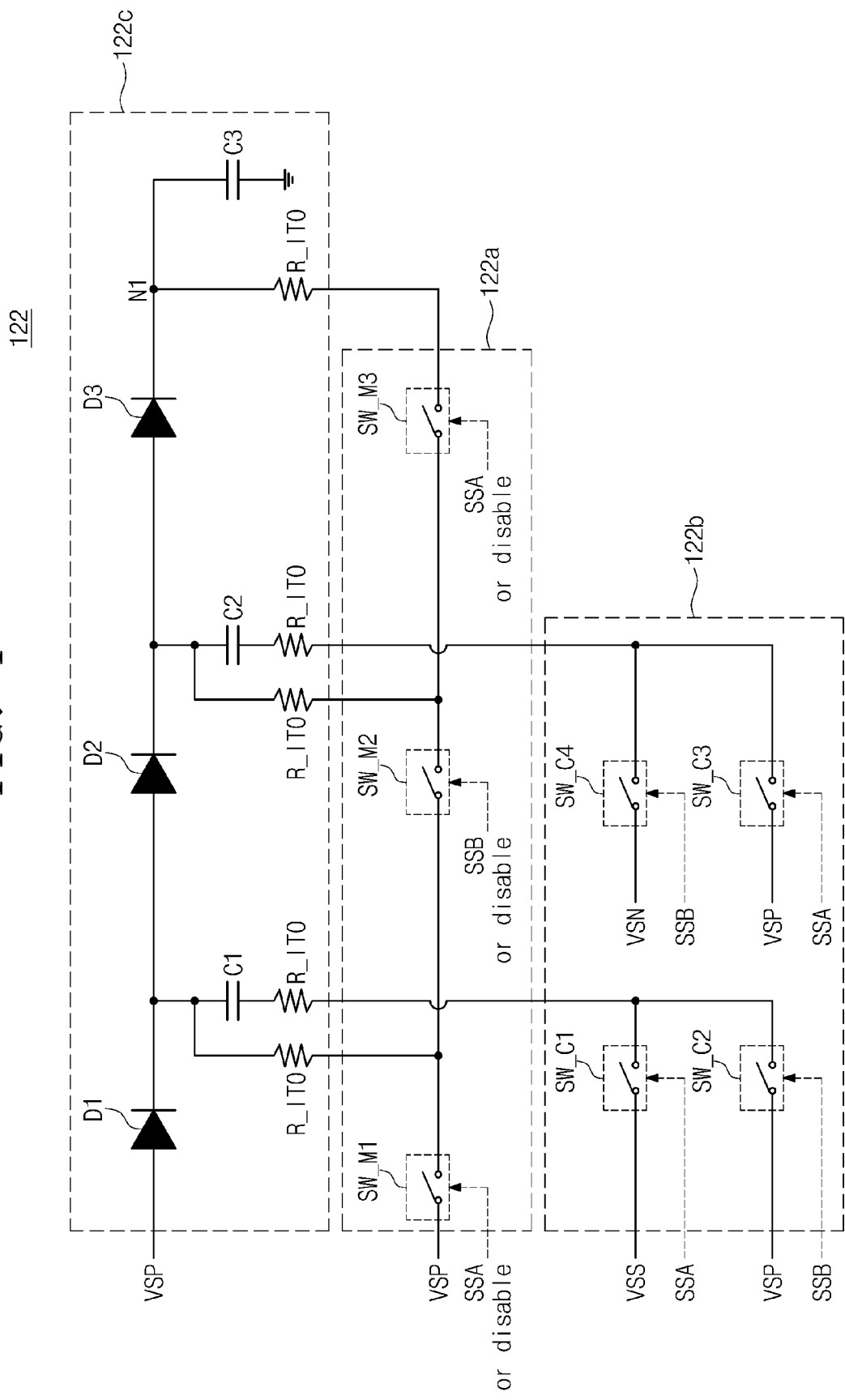
FIG. 4 is a circuit diagram of a charge pump shown in FIG. 3, according to an exemplary embodiment.

FIG. 4 is a circuit diagram of a charge pump shown in FIG. 3, according to an exemplary embodiment. Referring to FIGS. 3 and 4, a charge pump 122 includes a mode switch 122a, a control switch 122b, and an output circuit 122c which includes first, second, and third capacitors C1, C2, and C2, and first, second, and third diodes D1, D2, and D3. The mode switch 122a includes first, second, and third mode switches SW_M1, SW_M2, and SW_M3, and the control switch 122b includes first, second, third, and fourth control switches SW_C1, SW_C2, SW_C3, and SW_C4. In exemplary embodiments, each of the first, second, and third mode switches SW_M1, SW_M2, and SW_M3, the first, second, third, and fourth control switches SW_C1, SW_C2, SW_C3, and SW_C4, and the first, second, and third diodes D1, D2, and D3 may be implemented with a transistor or any other active element.

Elements of the charge pump 122 are connected as illustrated in FIG. 4.

As a more detailed example, a first voltage VSP is provided to an input terminal of the first mode switch SW_M1. An output terminal of the first mode switch SW_M1 is connected to an input terminal of the second mode switch SW_M2 and one end of the first capacitor C1. An output terminal of the second mode switch SW_M2 is connected to an input terminal of the third mode switch SW_M3 and one end of the second capacitor C2. An output terminal of the third mode switch SW_M3 is connected to a first node N1.

An input terminal of the first control switch SW_C1 receives a third voltage VSS, and an output terminal thereof is connected to the other end of the first capacitor C1. An input terminal of the second control switch SW_C2 receives the first voltage VSP, and an output terminal thereof is connected to the other end of the first capacitor C1. An input terminal of the third control switch SW_C3 receives the first voltage VSP, and an output terminal thereof is connected to the other end of the second capacitor C2. An input terminal of the fourth control switch SW_C4 receives a second voltage VSN, and an output terminal thereof is connected to the other end of the second capacitor C2.

The other end of the first capacitor C1 is connected to the output terminal of the first control switch SW_C1 and the output terminal of the second control switch SW_C2, and the one end thereof is connected to an output terminal of the first diode D1 and the output terminal of the first mode switch SW_M1. The other end of the second capacitor C12 is connected to the output terminal of the third control switch SW_C3 and the output terminal of the fourth control switch SW_C4, and the one end thereof is connected to an output terminal of the second diode D2 and the output terminal of the second mode switch SW_M2. One end of the third capacitor C3 is connected to the first node N1, and the other end thereof is grounded.

The first to third diodes D1 to D3 are connected in series. An input terminal of the first diode D1 receives the first voltage VSP, and an output terminal of the third diode D3 is connected to the first node N1.

In exemplary embodiments, the first capacitor C1 and the first mode switch SW_M1, the first capacitor C1 and the first control switch SW_C1, the second capacitor C2 and the second mode switch SW_M2, the second capacitor C2 and the fourth control switch SW_C4, and the first node N1 and the third mode switch SW_M3 are respectively connected through a transparent electrode ITO that is provided on a display panel 110 and has a resistance R_ITO. In exemplary embodiments, the resistance R_ITO may be a parasitic resistance of the transparent electrode ITO that is provided on the display panel 110 connecting the DDI 120 and the flexible printed circuit 130.

Elements of the charge pump 122 shown in FIGS. 3 and 4 may operate in response to first and second switching signals SSA and SSB.

For example, the mode switch 122a and the control switch 122b charge the first node N1 up to a high voltage in response to the first and second switching signals SSA and SSB. As a more detailed example, the first mode switch SW_M1, the third mode switch SW_M3, the first control switch SW_C1, and the third control switch SW_C3 operate in response to the first switching signal SSA. The second mode switch SW_M2, the second control switch SW_C2, and the fourth control switch SW_C4 operate in response to the second switching signal SSB. The first to third capacitors C1 to C3 may be charged according to a switching operation of each switch.

In exemplary embodiments, the first, second, and third mode switches SW_M1, SW_M2, and SW_M3 may be enabled or disabled according to an operating mode of the charge pump 122. For example, as described above, when a level of a driving current of the display panel 110 connected to the DDI 120 is higher than a predetermined level, the charge pump 122 may operate in a high-current mode. At this time, the first, second, and third mode switches SW_M1, SW_M2, and SW_M3 may be disabled to maintain a turn-off state. In contrast, when a level of a driving current of the display panel 110 connected to the DDI 120 is lower than the predetermined level, the charge pump 122 may operate in a low-current mode. At this time, the first, second, and third mode switches SW_M1, SW_M2, and SW_M3 may be enabled and may operate in response to the first switching signal SSA or the second switching signal SSB.

As described above, a current driving range of the DDI 120 may widen by changing an operating mode of the charge pump 122 of the DDI 120 according to a driving current of the display panel 110. In exemplary embodiments, as the size of the display panel 110 increases, a driving current of the display panel 110 increases. That is, since the current driving range widens using a charge pump having the same structure, there can be provided a charge pump capable of reducing manufacturing costs and improving performance and a DDI including such charge pump.

Figure 5:
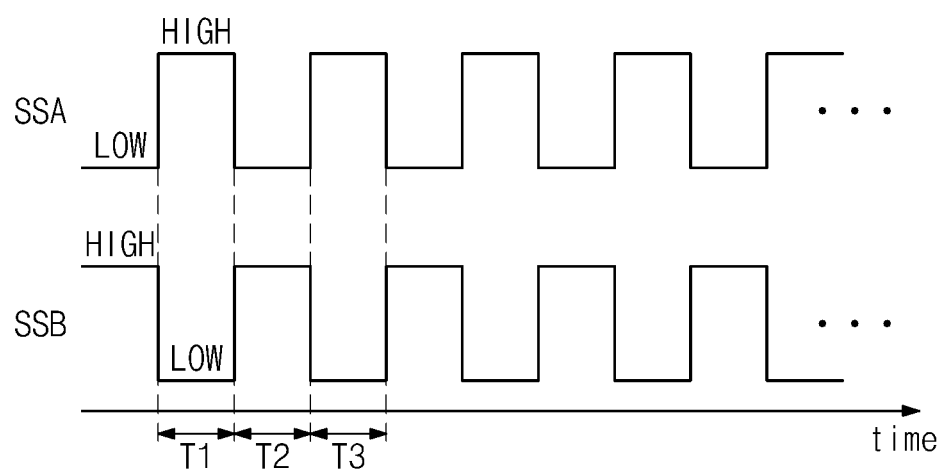
FIG. 5 is a timing diagram of first and second switching signals, according to an exemplary embodiment.
Figure 6:
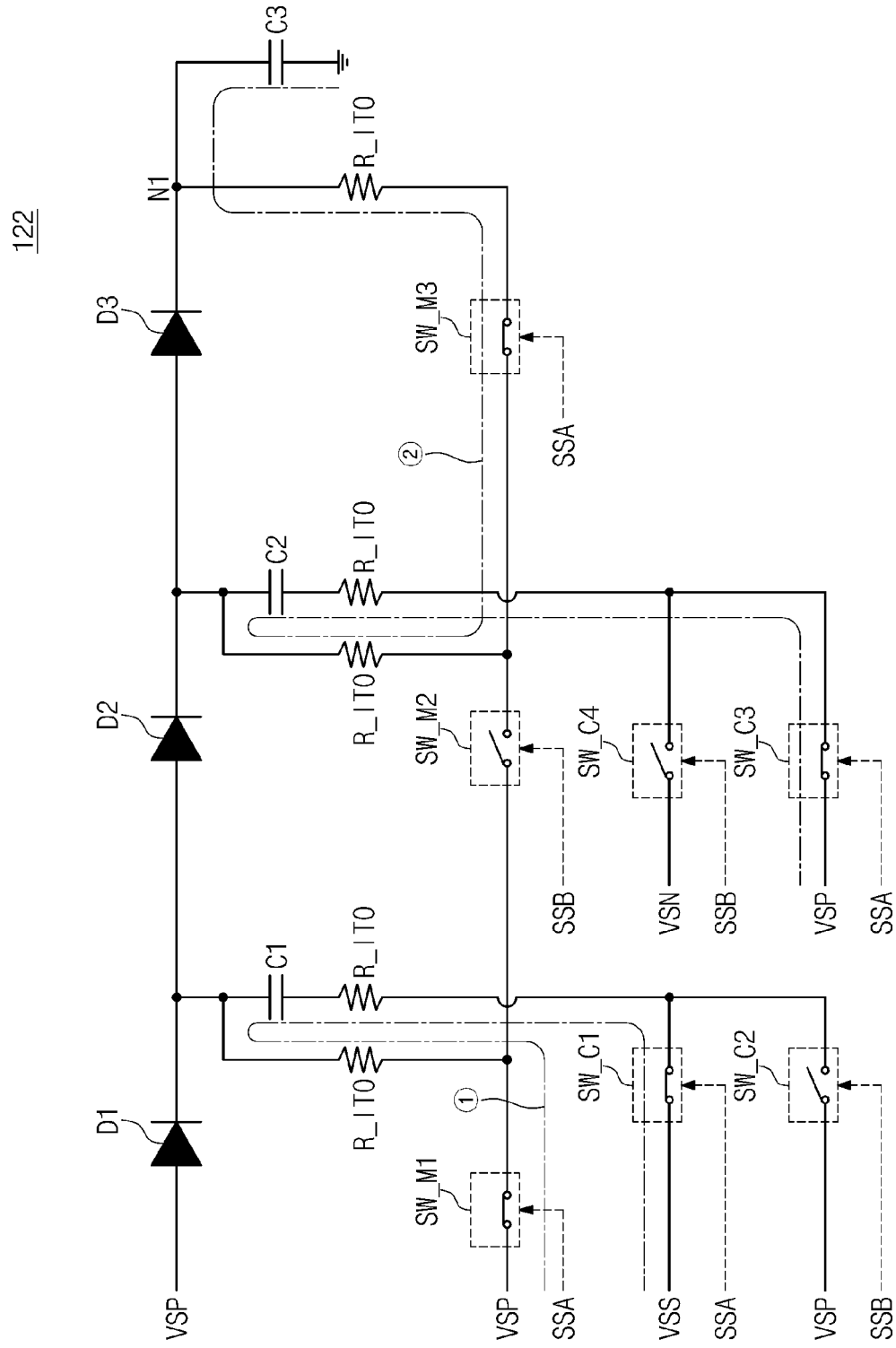
FIGS. 6 and 7 are circuit diagrams for describing a low-current mode of a charge pump, according to exemplary embodiments.
Figure 7:
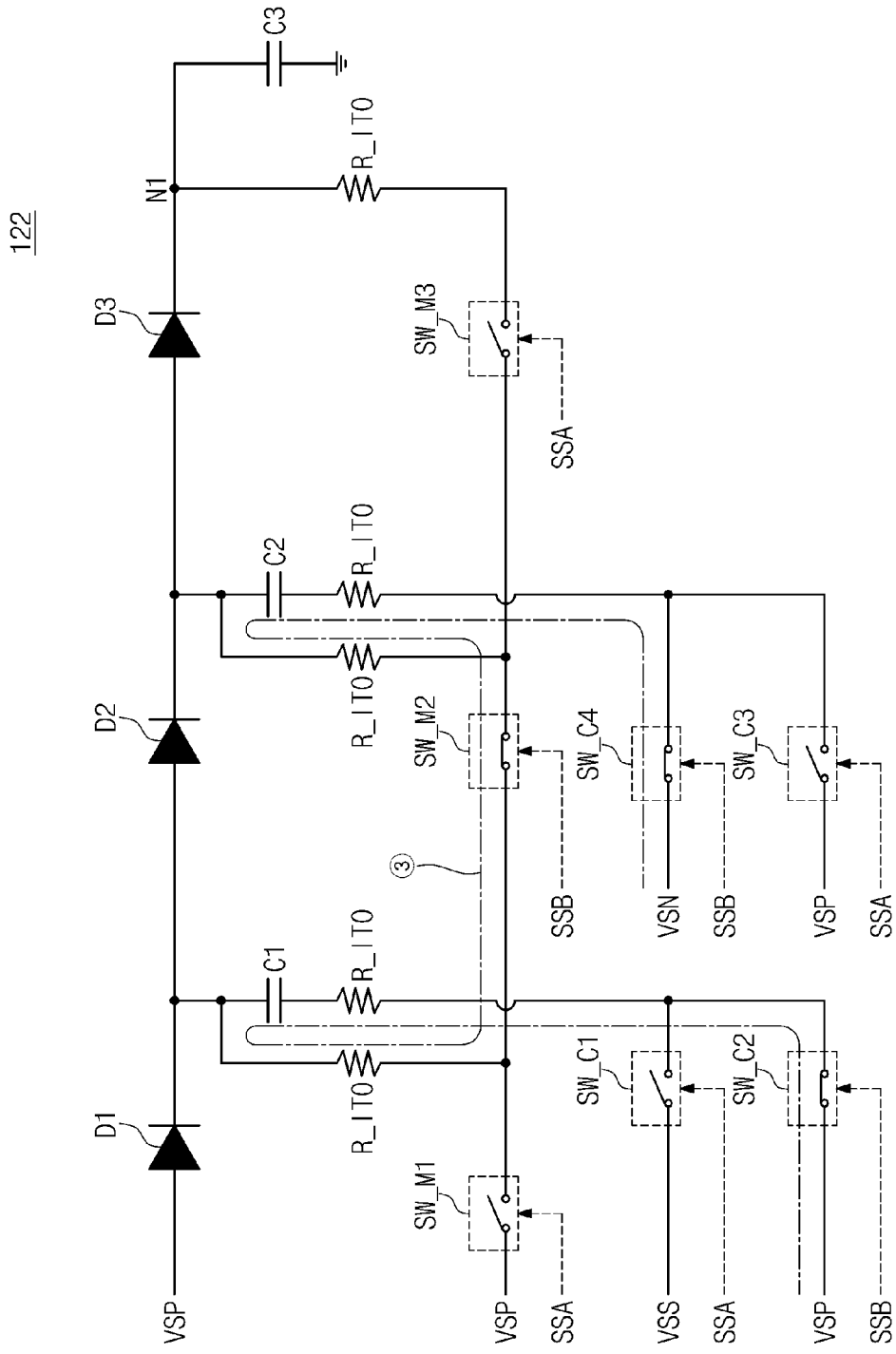

FIG. 5 is a timing diagram of the first and second switching signals SSA, SSB, respectively, according to an exemplary embodiment. FIGS. 6 and 7 are circuit diagrams for describing a low-current mode of a charge pump, according to exemplary embodiments. As described above, when a level of a driving current of a display panel 110 is lower than a predetermined level (i.e., when the size of the display panel 110 is small), the charge pump 122 that the DDI 120 includes may operate in a low-current mode. For the sake of easy description, elements of the charge pump 122 and a connection relationship thereof described with reference to FIG. 4 are omitted. Also, it is assumed that switches are turned on when switching signals are logically high and turned off when they are logically low. However, the scope and spirit of the inventive concept may not be limited thereto.

Referring to FIGS. 5 and 6, when the charge pump 122 operates in the low-current mode, first to third mode switches SW_M1 to SW_M3 are enabled. At this time, the first and third mode switches SW_M1 and SW_M3 operate in response to the first switching signal SSA, and the second mode switch SW_M2 operates in response to the second switching signal SSB.

During a first time period T1 where the first switching signal SSA is logically high and the second switching signal SSB is logically low, the charge pump 122 has current paths formed as illustrated in FIG. 6.

As a more detailed example, during the first time period T1, a first current path (①) is formed when the first mode switch SW_M1 and the first control switch SW_C1 are turned on in response to the first switching signal SSA. During the first time period T1, a second current path (②) is formed when the third mode switch SW_M3 and the third control switch SW_C3 are turned on in response to the first switching signal SSA. Since the second switching signal SSB is logically low during the first time period T1, the second mode switch SW_M2, the second control switch SW_C2, and the fourth control switch SW_C4 remain at a turn-off state.

A first capacitor C1 is charged with a first voltage VSP or a voltage lower by a predetermined level than the first voltage VSP, by the first voltage VSP and the third voltage VSS provided along the first current path (①). In exemplary embodiments, the predetermined level may be a level of a voltage dropped by the resistance R_ITO. A second capacitor C2 is charged with the first voltage VSP or a voltage lower by the predetermined level than the first voltage VSP, by the first voltage VSP provided along the second current path (②).

Referring to FIGS. 5 and 7, during a second time period T2 following the first time period T1, the charge pump 122 has current paths formed as illustrated in FIG. 7. As a more detailed example, during the second time period T2, the first switching signal SSA is logically low, and the second switching signal SSB is logically high. A third current path (③) is formed when the second mode switch SW_M2, the second control switch SW_C2, and the fourth control switch SW_C4 are turned on in response to the second switching signal SSB. Since the first switching signal SSA is logically low during the second time period T2, the first mode switch SW_M1, the third mode switch SW_M3, the first control switch SW_C1, and the third control switch SW_C3 maintain a turn-off state.

Voltages charged in the first and second capacitors C1 and C2 are boosted by the first and second voltages VSP and VSN provided through the third current path (③). That is, voltages of the first and second capacitors C1 and C2 charged by the first voltage VSP or a voltage lower by a predetermined level than the first voltage VSP during the first time period T1 are boosted by the first and second voltages VSP and VSN provided through the third current path (③).

During a third time period T3, the first switching signal SSA is logically high, and the second switching signal SSB is logically low. In this case, the charge pump 122 that operates in the low-current mode has current paths formed as illustrated in FIG. 6. At this time, a voltage of a first node N1 increases by a charged voltage of the second capacitor C2 and the first voltage VSP provided through the second current path (②).

As described above, the charge pump 122 that operates in the low-current mode iterates operations described with reference to FIGS. 6 and 7 to raise a voltage of the first node N1 up to a high voltage VGH. In exemplary embodiments, the high voltage VGH may be about 15 V. In exemplary embodiments, the high voltage VGH may be provided to the gate line driver 124. The gate line driver 124 receives the high voltage VGH and drives a plurality of gate lines GL1 to GLn according to a control of the logic circuit 123.

Figure 8:
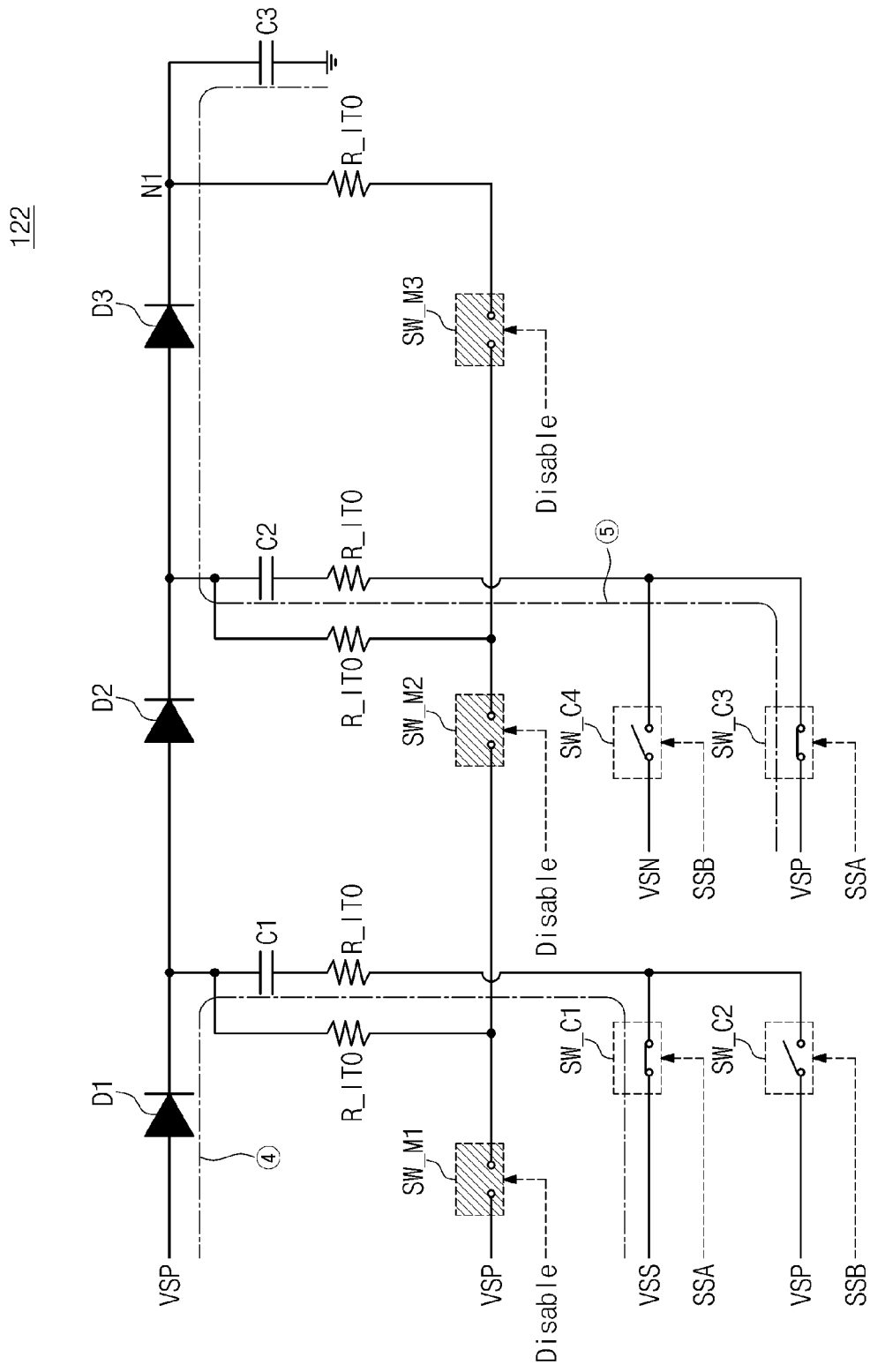
FIGS. 8 and 9 are circuit diagrams for describing a charge pump operating in a high-current mode, according to exemplary embodiments.
Figure 9:
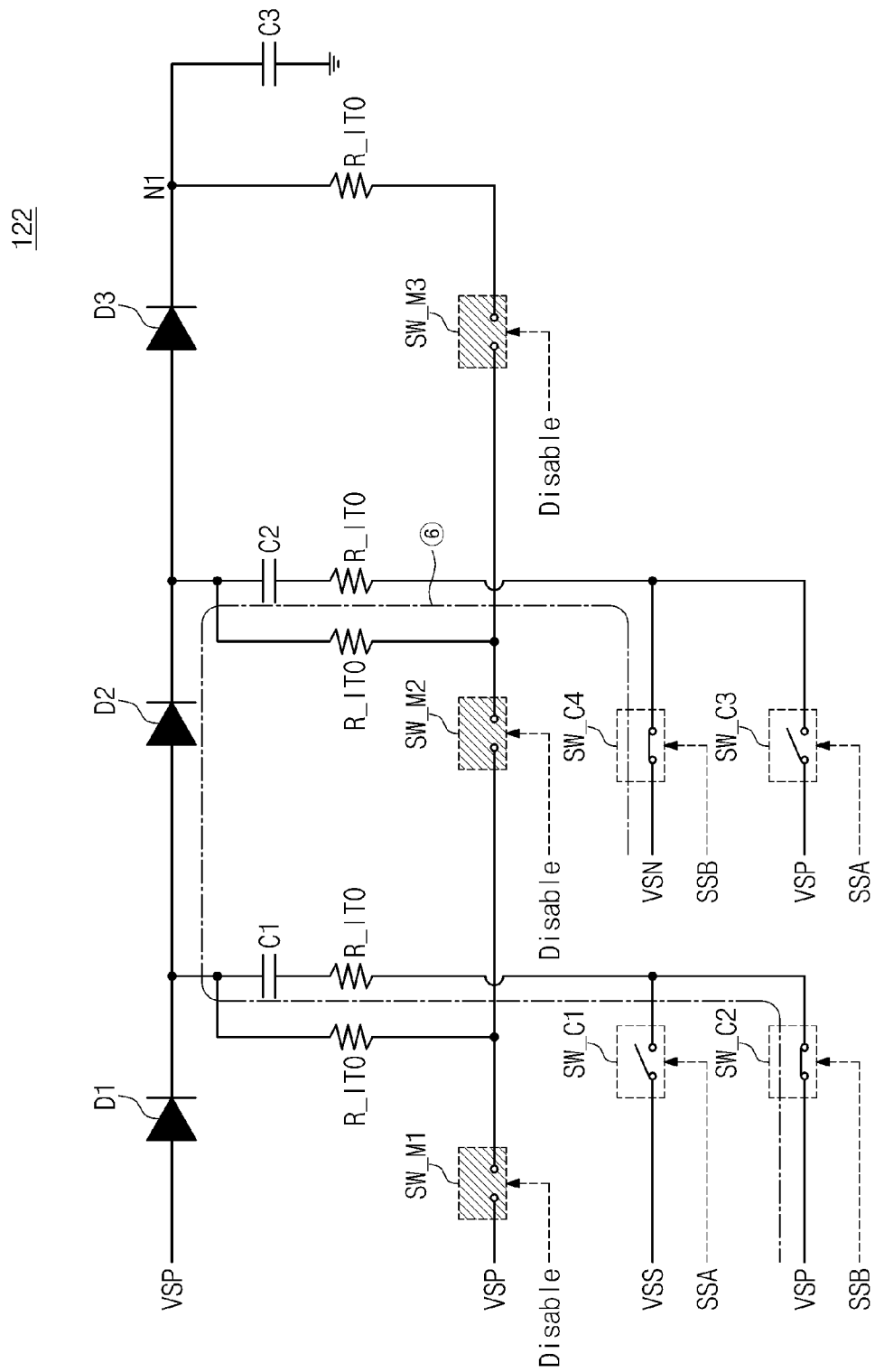

FIGS. 8 and 9 are circuit diagrams for describing a charge pump operating in a high-current mode. For the sake of easy description, the elements of the charge pump 122 and the connection relationship thereof described with reference to FIG. 4 are omitted. As described above, when a level of a driving current of a display panel 110 is higher than a predetermined level (i.e., when the size of the display panel 110 is large), a charge pump 122 included in a display driving integrated circuit (DDI) 120 may operate in a high-current mode. When the charge pump 122 operates in the high-current mode, first, second, and third mode switches SW_M1, SW_M2, and SW_M3 are disabled. In other words, the first, second, and third mode switches SW_M1, SW_M2, and SW_M3 disabled may maintain a turn-off state. In exemplary embodiments, the first, second, and third mode switches SW_M1, SW_M2, and SW_M3 may be disabled by setting a separate fuse. Alternatively, the first, second, and third mode switches SW_M1, SW_M2, and SW_M3 may receive a disable signal (not shown) through a separate terminal.

Referring to FIGS. 5 and 8, during a first time period T1, a fourth current path (④) is formed as the first control switch SW_C1 is turned on in response to the first switching signal SSA. During the first time period T1, a fifth current path (⑤) is formed as a third control switch SW_C3 is turned on in response to the first switching signal SSA. During the first time period T1, second and fourth control switches SW_C2 and SW_C4 are turned off in response to the second switching signal SSB.

The first voltage VSP provided through the fourth current path (④) permits the first capacitor C1 to be charged with the first voltage VSP or a voltage lower by the predetermined level than the first voltage VSP. The first voltage VSP provided through the fifth current path (⑤) permits the second capacitor C2 to be charged with the first voltage VSP or a voltage lower by the predetermined level than the first voltage VSP.

Referring to FIGS. 5 and 9, during a second time period T2 after the first time period T1, the first switching signal SSA is logically low, and the second switching signal SSB is logically high. A sixth current path (⑥) is formed as the second and fourth control switches SW_C2 and SW_C4 are turned on in response to the second switching signal SSB. A voltage of the second capacitor C2 is raised up, for example, to a voltage higher than the first voltage VSP, by the first and second voltages VSP and VSN provided through the sixth current path (⑥). During the second time period T2, the first and third control switches SW_C1 and SW_C3 are turned off in response to the first switching signal SSA.

During a third time period T3 following the second time period T2, the first switching signal SSA is logically high, and the second switching signal SSB is logically low. That is, the charge pump 122 operates as described with reference to FIG. 8. Afterwards, the charge pump 122 iterates operations described with reference to FIGS. 8 and 9 in response to the first and second switching signals SSA and SSB to charge a first node N1 with the high voltage VGH. A voltage of the first node N1 may be provided to the gate line driver 124.

As described above, the charge pump 122 of the DDI 120 may change an operating mode according to a driving current that the display panel 110 requires (or the size of the display panel 110). Thus, since the DDI 120 has a wide current driving capacity, it is possible to provide a display driving integrated circuit capable of reducing costs and improving performance.

Figure 10:
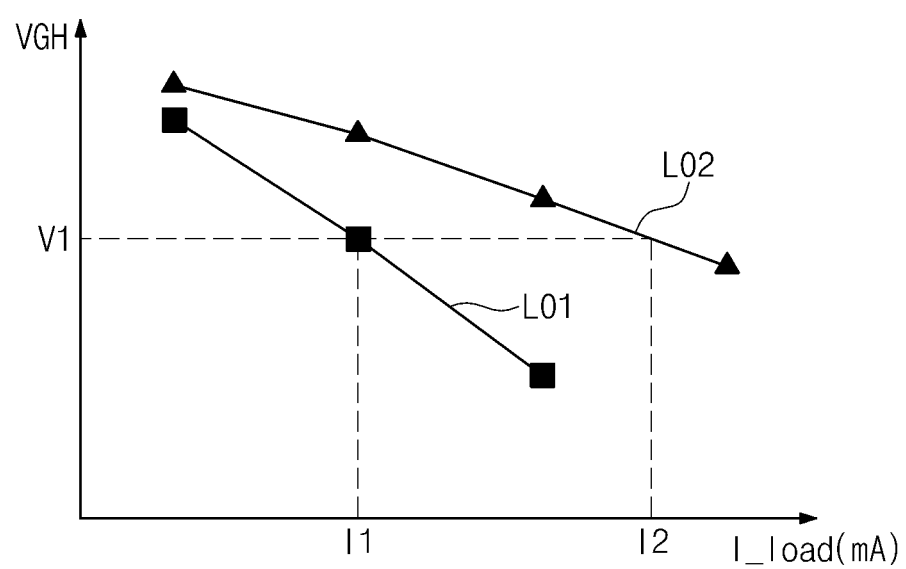
FIG. 10 is a graph schematically illustrating a current driving capacity depending on an operating mode of a charge pump, according to an exemplary embodiment.

FIG. 10 is a graph schematically illustrating a current driving capacity depending on an operating mode of a charge pump, according to an exemplary embodiment. In FIG. 10, the abscissa represents a driving current (i.e., a driving current that the display panel 110 requires), and the ordinate represents a voltage of a first node N1 (i.e., an output of the charge pump 122). Referring to FIGS. 2 and 10, a first line L01 indicates an output voltage of the charge pump 122 that operates in a low-current mode, and a second line L02 indicates an output voltage of the charge pump 122 that operates in a high-current mode.

As illustrated in FIG. 10, as a driving current increases, an output voltage of the charge pump 122 decreases. It is assumed that a voltage level that the gate line driver 124 needs is V1. That is, the charge pump 122 has to provide the gate line driver 124 with a voltage higher than V1. If the charge pump 122 operates in the low-current mode, a driving current having a first current value I1 (refer to the first line L01) is provided to the gate line driver 124. If the charge pump 122 operates in the high-current mode, a driving current having a second current value I2 (refer to the second line L02) is provided to the gate line driver 124.

That is, when a level of a driving current that a display panel needs is lower than the first current value I1, the charge pump 122 operates in the low-current mode as described with reference to FIGS. 6 and 7. In contrast, when a level of the driving current that the display panel needs is higher than the second current value I2, the charge pump 122 operates in the high-current mode as described with reference to FIGS. 8 and 9. That is, since a wide current driving condition is satisfied using a single structure of charge pump 122, it is possible to provide a display driving integrated circuit capable of reducing costs and improving performance.

Figure 11:
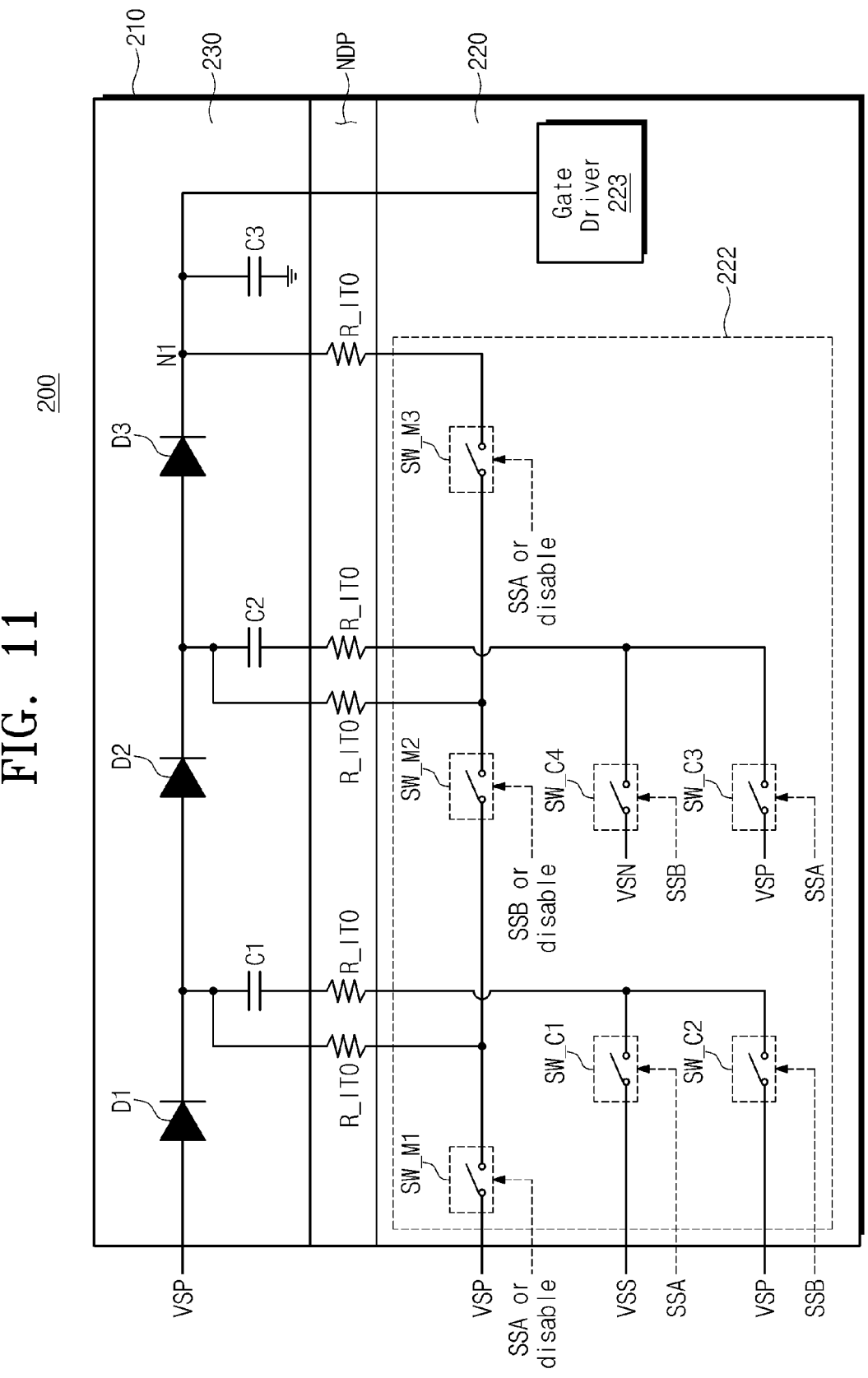
FIG. 11 is a detailed diagram of a display device including a charge pump according to an exemplary embodiment.

FIG. 11 is a detailed diagram of a display device including a charge pump according to an exemplary embodiment. Elements unnecessary to describe an organization of a charge pump are skipped for the sake of easy description. Referring to FIG. 11, a display device 200 includes a display panel 210, a DDI 220, and an FPC 230. A detailed description on above-described elements is omitted for the sake of easy description.

The DDI 220 is provided on the display panel 210. As a more detailed example, the DDI 220 is provided on a non-display area NDP of the display panel 210 in a chip on glass (COG) manner and is connected to the FPC 230 through a transparent electrode ITO.

The charge pump 222 included in the DDI 220 of FIG. 11 includes a portion of a charge pump 112 of FIG. 4. That is, the charge pump 222 may include a mode switch 122a and a control switch 122b described with reference to FIG. 4. The rest of the charge pump 222 may be included in the FPC 230. As a more detailed example, first to third mode switches SW_M1 to SW_M3 and first to fourth control switches SW_C1 to SW_4 of the charge pump 222 are included in the DDI 220, and first to third capacitors C1 to C3 and first to third diodes D1 to D3 are provided on the flexible printed circuit 230.

In above-described exemplary embodiments, a charge pump or a portion of the charge pump is described as being included in a DDI. However, the scope and spirit of the inventive concept may not be limited thereto. For example, the charge pump may be included in any other component or may be provided outside the DDI.

Figure 12:
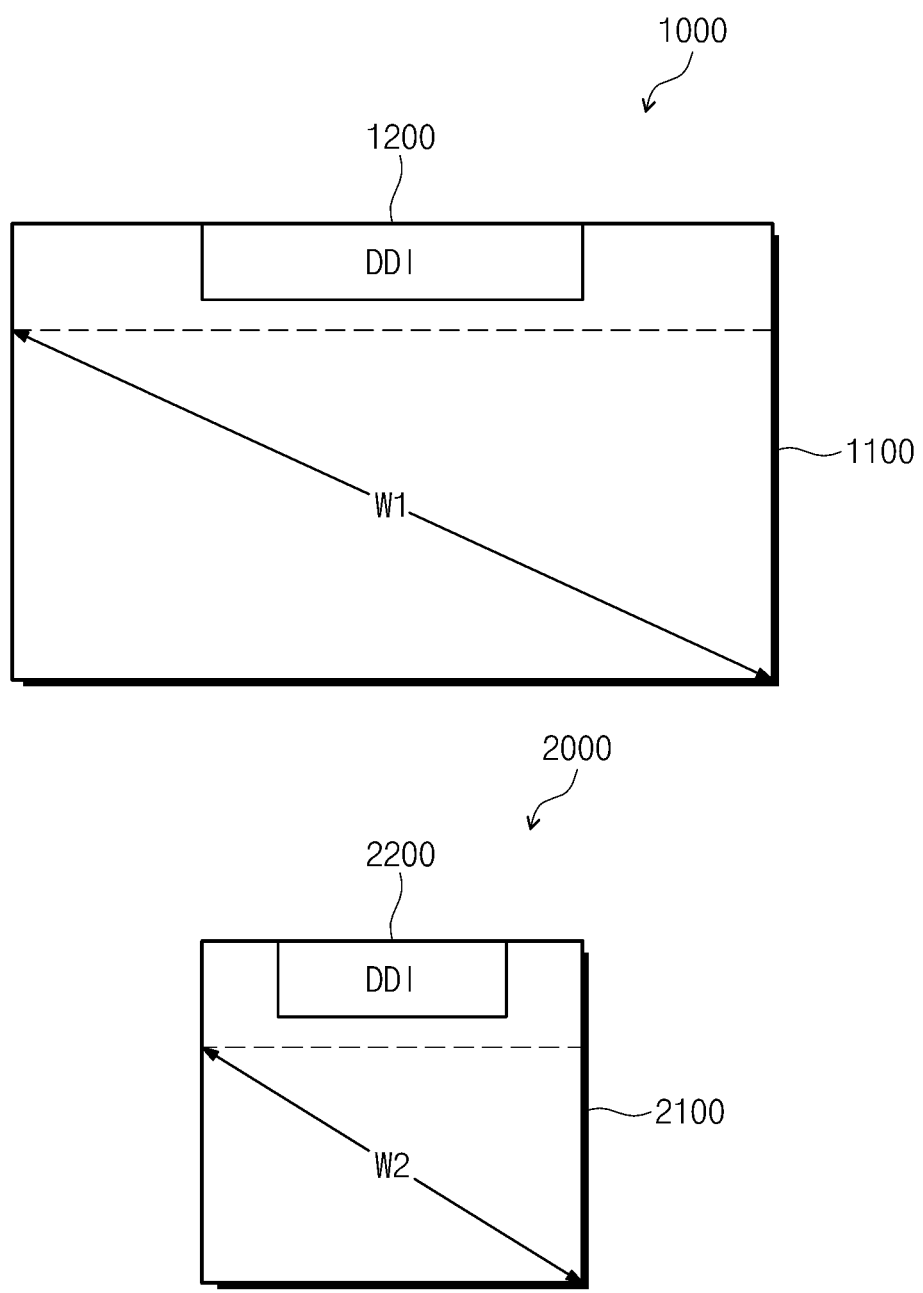
FIG. 12 shows diagrams for describing a display driving integrated circuit according to an exemplary embodiment.

FIG. 12 shows diagrams for describing a DDI according to an exemplary embodiment. Referring to FIG. 12, a first display 1000 includes a first display panel 1100 and a DDI 1200. A second display device 2000 includes a second display panel 2100 and a DDI 2200. In exemplary embodiments, the DDIs 1200 and 2200 may include the same charge pump as described with reference to FIGS. 1 through 11.

In exemplary embodiments, a length of the first display 1100 is a first length W1, and a length of the second display panel 2100 is a second length W2 shorter than the first length W1. That is, the size of the first display panel 1100 is larger than that of the second display panel 2100, and a driving current of the first display panel 1100 is greater than that of the second display panel 2100. As described above, the DDIs 1200 and 2200 include charge pumps having the same structure. Only, a charge pump of the DDI 1200 connected to the first display panel 1100 operates in a high-current mode, and a charge pump of the DDI 2200 connected to the second display panel 2100 operates in a low-current mode.

That is, since a single structure of charge pump is applied to display panels having different sizes, costs needed to manufacture a charge pump or a DDI including the charge pump is reduced, and performance is improved.

Figure 13:
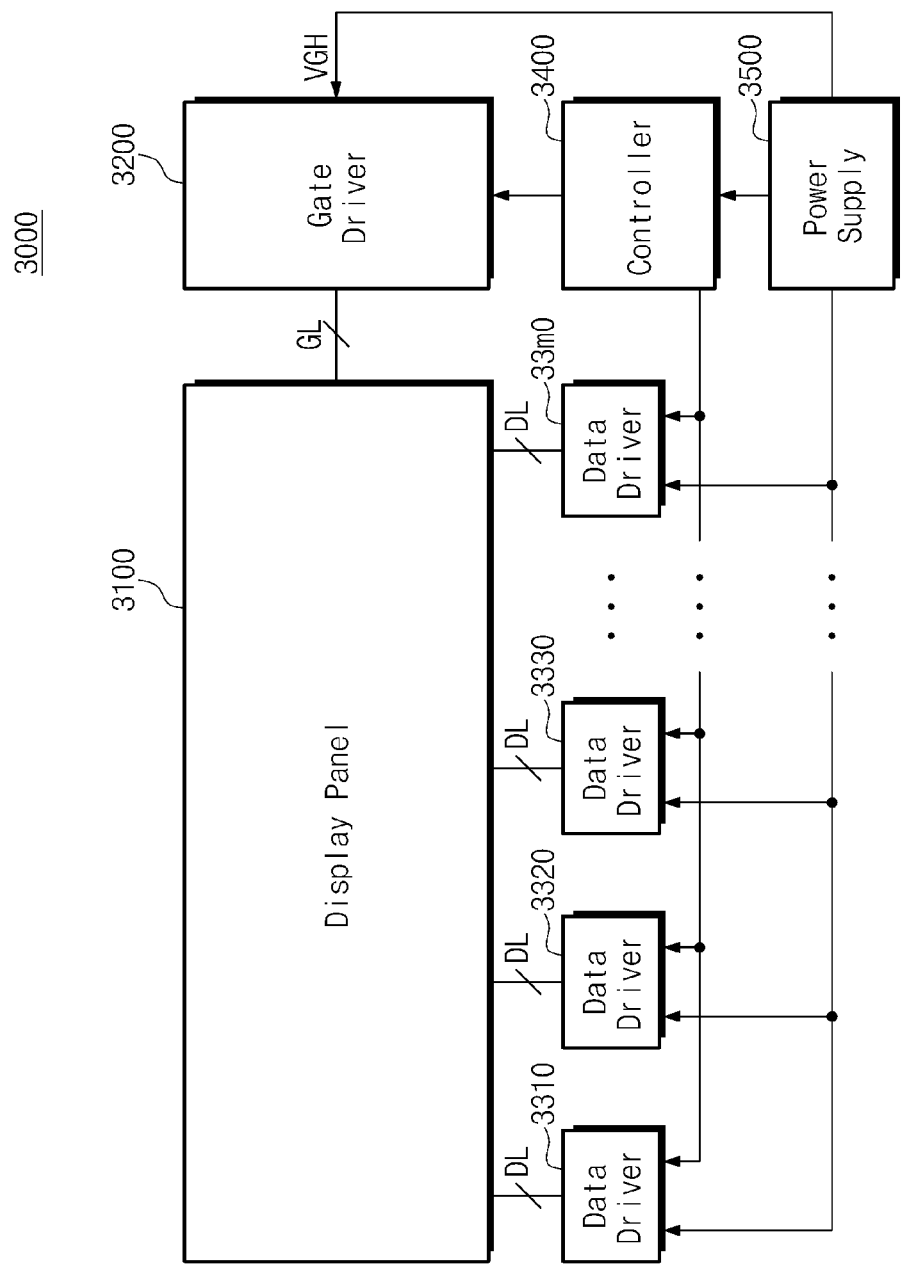
FIG. 13 is a block diagram schematically illustrating a display device according to another exemplary embodiment.

FIG. 13 is a block diagram schematically illustrating a display device according to another exemplary embodiment. Referring to FIG. 13, a display device 3000 includes a display panel 3100, a gate line driver 3200, a plurality of data line drivers 3310 to 33m0, a controller 3400, and a power supply 3500. The display panel 3100, gate line driver 3200, and data line drivers 3310 to 33m0 are described with reference to FIGS. 1 and 3, and a detailed description thereof is thus omitted.

The controller 340 controls the gate line driver 3200 and the data line drivers 3310 to 33m0 in response to image data and a control signal received from an external device. In exemplary embodiments, the controller 3400 may perform the same function as a logic circuit described with reference to FIGS. 1 and 3.

The power supply 3500 generates various voltages needed to drive the display device 3000. For example, the power supply 3500 receives a plurality of voltages from an external power supply and generates a high voltage VGH using the received voltages to provide it to the gate line driver 3200. The gate line driver 3200 drives gate lines GL1 to GLn using the high voltage VGH.

In exemplary embodiments, the power supply 3500 may include a charge pump described with reference to FIGS. 1 to 11. The charge pump included in the power supply 3500 may operate in a low-current mode or a high-current mode according to a driving current of the display panel 3100 or the size of the display panel 3100.

Figure 14:
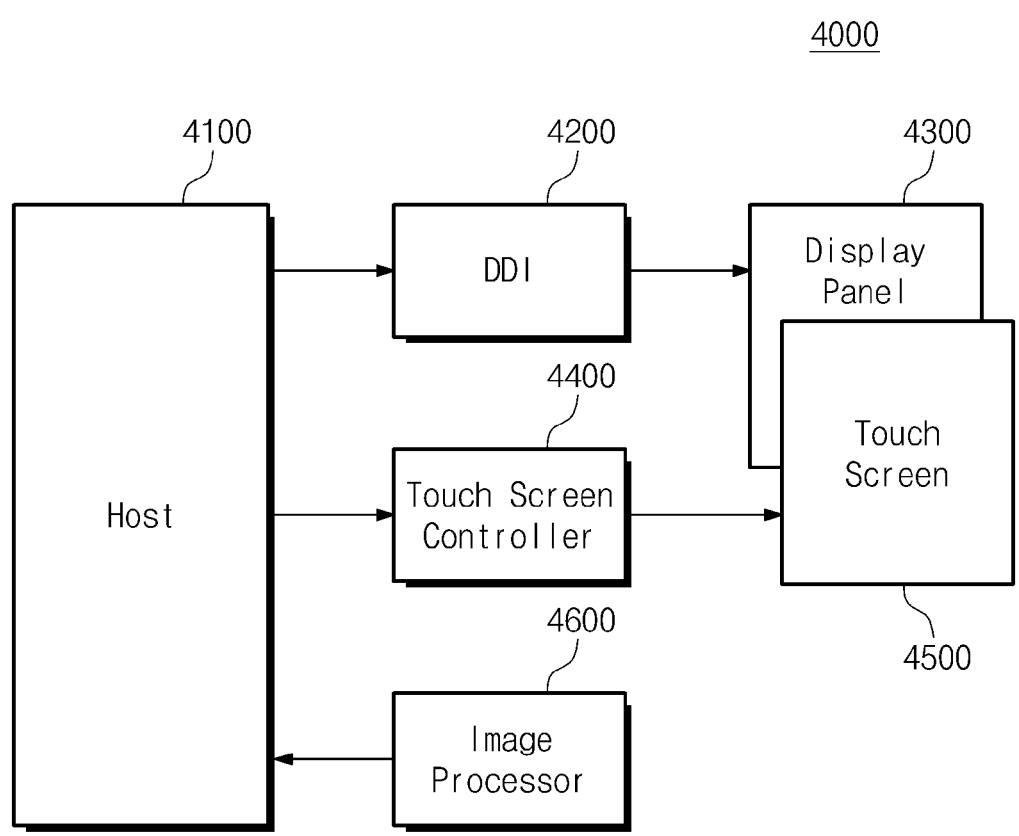
FIG. 14 is a block diagram schematically illustrating a user system to which a display driving integrated circuit according to an exemplary embodiment is applied.

FIG. 14 is a block diagram schematically illustrating a user system to which a display driving integrated circuit according to an exemplary embodiment of the inventive concept is applied. Referring to FIG. 14, a user system 4000 contains a host 4100, a display driving integrated circuit (DDI) 4200, a display panel 4300, a touch screen controller 4400, and a touch screen 4500.

The host 4100 receives data or an instruction from a user and controls the DDI 4200 and the touch screen controller 4400 based on the received data or instruction. The DDI 4200 drives the display panel 4300 according to a control of the host 4100. In exemplary embodiments, the DDI 4200 may include a charge pump described with reference to FIGS. 1 to 11. The touch screen 4500 may be provided to be overlapped with the display panel 4300 or may be provided on one substrate together with the display panel 4300. The touch screen controller 4500 receives touch data from the touch screen to provide it to the host 4100.

Figure 15:
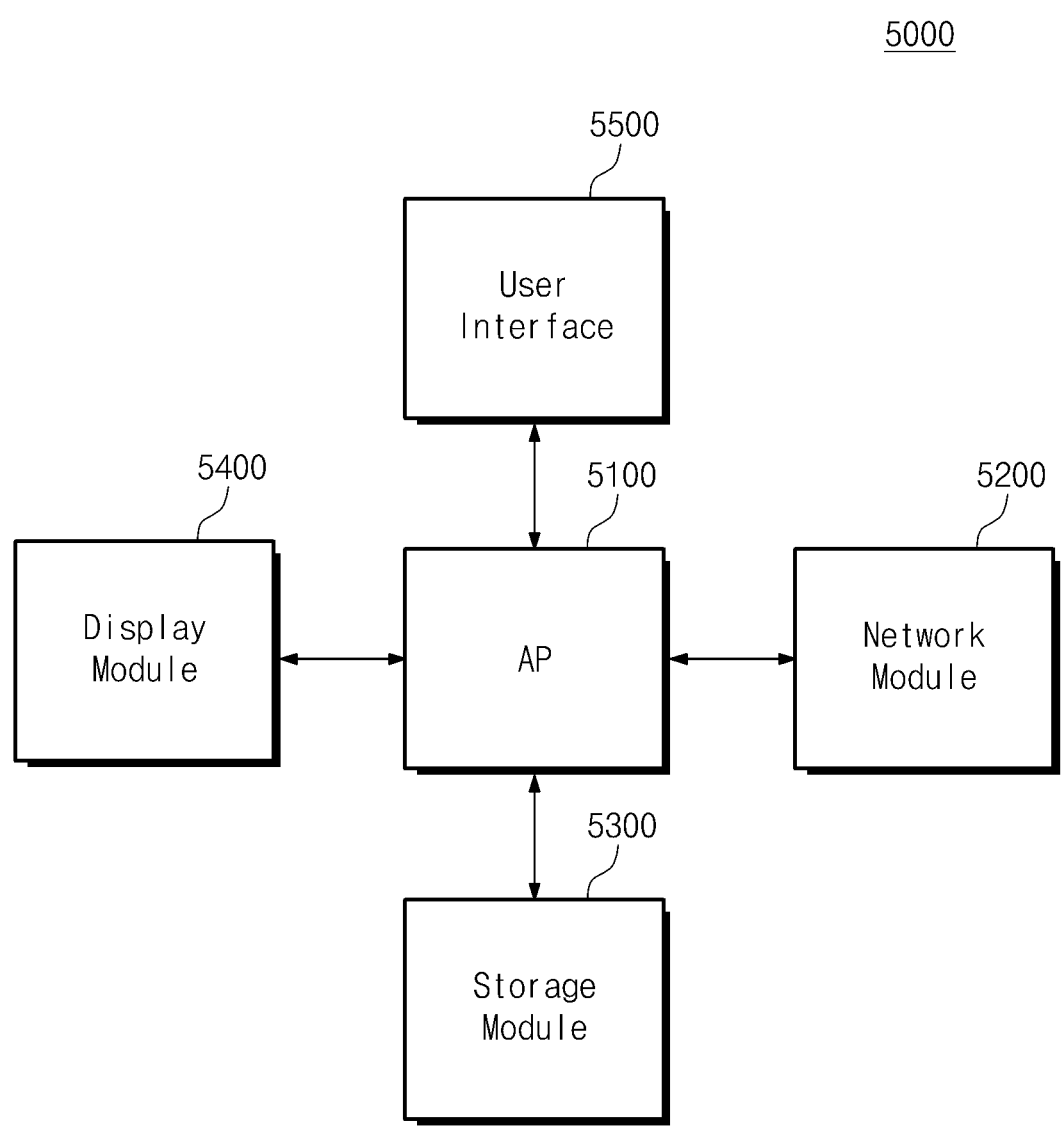
FIG. 15 is a block diagram schematically illustrating a mobile system including a display driving integrated circuit according to an exemplary embodiment.

FIG. 15 is a block diagram schematically illustrating a mobile system including a display driving integrated circuit according to an exemplary embodiment. Referring to FIG. 15, a mobile system 5000 includes an application processor 5100, a network module 5200, a storage module 5300, a display module 5400, and a user interface 5500.

In exemplary embodiments, the mobile system 5000 may be provided as a computer, a ultra-mobile personal computer (UMPC), a workstation, a net-book, a personal digital assistant (PDA), a portable computer, a web tablet, a wireless phone, a mobile phone, a smart phone, a smart television, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, or a digital video player.

The application processor 5100 drives components and an operating system of the mobile system 5000. In exemplary embodiments, the mobile processor 5100 may include a graphics engine, a controller for controlling components of the mobile system 5000, and interfaces.

The network module 5200 communicates with external devices. For example, the network module 5200 may support wireless communications, such as CDMA (Code Division Multiple Access), GSM (Global System for Mobile communication), WCDMA (wideband CDMA), CDMA-2000, TDMA (Time Division Multiple Access), LTE (Long Term Evolution), Wimax, WLAN, UWB, Bluetooth, and WI-DI.

The storage module 5300 stores data. For example, the storage module 5300 stores data received from an external device. Alternatively, the storage module 5300 provides the application processor 5100 with data stored therein. For example, the storage module 5300 may be implemented with a semiconductor memory device such as DRAM (dynamic random access memory), SDRAM (synchronous DRAM), SRAM (static RAM), DDR SDRAM (double date rate SDRAM), DDR2 SDRAM, DDR3 SDRAM, PRAM (phase-change RAM), MRAM (magnetic RAM), RRAM (resistive RAM), NAND flash memory, or NOR flash memory.

The display module 5400 outputs image data according to a control of the application processor 5400. In exemplary embodiments, the display module 5400 and the application processor 5100 communicate with each other based on a display serial interface (DSI). In exemplary embodiments, the display module 5400 may include a DDI and a display panel described with reference to FIGS. 1 to 11. The DDI included in the display module 6400 may include a charge pump described with reference to FIGS. 1 to 11.

The user interface 5500 may provide interfaces for inputting or outputting data or instructions to or from the application processor 5100. For example, the input interface 5500 may include user input devices, such as a camera, a touch screen, a motion recognition module, and a microphone and output devices, such as a speaker and a touch screen.

According to the above-described exemplary embodiments, a DDI that drives gate lines and data lines included in a display panel may include a charge pump to output a driving voltage. The charge pump may operate in any one of a high-current mode and a low-current mode according to the size of a display panel (or a driving current of the display panel). Thus, since a current driving capacity of the charge pump having a single structure is improved, a manufacturing costs of the charge pump may be reduced.

In the above-described exemplary embodiments, the charge pump 122 is described as raising or boosting a voltage provided from an outside power source. However, the inventive concept is not limited thereto. According to requirements of a display panel and display device or according to different circuit purposes, the charge pump 122 may be configured to reduce a voltage provided from the outside power source by changing polarity of various signals supplied to the charge pump. Also, in the above-described exemplary embodiment, the charge pump 122 is indicated to include only a given number of switches, capacitors, resistors and diodes; however, the inventive concept is not limited thereto. The number of these circuit elements may change as long as the inventive concept is complied with.

While the inventive concept has been described with reference to exemplary embodiments, it will be apparent to those skilled in the art that various changes and modifications may be made without departing from the spirit and scope of the inventive concept. Therefore, it should be understood that the above exemplary embodiments are not limiting, but illustrative.

What is claimed is:

1. A display driving integrated circuit comprising:
   a signal generator configured to generate a first switching signal and a second switching signal being complementary to the first switching signal; and
   a charge pump configured to change a first voltage from an external power source to generate an output voltage in response to the first and second switching signals and operate in one of low-current mode and high-current mode,
   wherein the charge pump comprises:
      a first diode, a second diode, and a third diode connected in series;
      a plurality of control switches configured to selectively output one of the first voltage and a second voltage in response to the first and second switching signals;
      a first capacitor connected between an output terminal of the first diode and a first part of the plurality of control switches;
      a second capacitor connected between an output terminal of the second diode and a second part of the plurality of control switches; and
      a first mode switch, a second mode switch, and a third mode switch connected in series, one terminal of each of the first, second, and third mode switches connected to an output terminal of each of the first, second, and third diodes, respectively,
   wherein, in response to the charge pump operating in the high-current mode, the first, second, and third switches are disabled to maintain a turn-off state.

2. The display driving integrated circuit of claim 1, wherein if the charge pump operates in the low-current mode, the first mode switch is configured to operate in response to the first switching signal, the second mode switch is configured to operate in response to the second switching signal, and the third mode switch is configured to operate in response to the first switching signal.

3. The display driving integrated circuit of claim 2, wherein the first part of the plurality of control switches comprises a first control switch connected between the a first terminal providing the second voltage and the first capacitor, and a second control switch connected between a second terminal providing the first voltage and the first capacitor, and
   wherein the second part of the plurality of control switch comprises a third control switch connected between the second terminal and the second capacitor, and a fourth control switch connected between the first terminal and the second capacitor.

4. The display driving integrated circuit of claim 3, wherein the first and third control switches are configured to operate in response to the first switching signal, and the second and fourth switches are configured to operate in response to the second switching signal.

5. The display driving integrated circuit of claim 4, wherein, if the charge pump operates in the low-current mode, a first current path via the first mode switch, the first capacitor, and the first control switch, and a second current path via the third control switch are formed in response to the first switching signal, and a third current path via the second control switch, the first capacitor, the second mode switch, the second capacitor, and the fourth control switch is formed in response to the second switching signal.

6. The display driving integrated circuit of claim 5, wherein each of the first and second capacitors is charged with the first voltage through the first and second current paths, respectively, and
wherein the first and second capacitors are boosted by the first and second voltages through the third current path.

7. The display driving integrated circuit of claim 4, wherein if the charge pump operates in the high-current mode, a first current path via the first control switch, the first capacitor, and the first diode, and a second current path via the third control switch, the second capacitor, and the third diode are formed in response to the first switching signal, and a third current path via the second control switch, the first capacitor, the second diode, the second capacitor, and the fourth control switch is formed in response to the second switching signal.

8. The display driving integrated circuit of claim 7, wherein each of the first and second capacitors is charged with the first voltage through the first and second current paths, respectively, the first and second capacitors are boosted by the first and second voltages through the third current path.

9. The display driving integrated circuit of claim 1, further comprising:
a gate driver configured to generate gate signals based on the output voltage, the gate signals being provided to an external display panel.

10. The display driving integrated circuit of claim 9, wherein the charge pump operates in one of low-current mode and high-current mode based on a size of the external display panel.

11. The display driving integrated circuit of claim 1, wherein the first to third diodes and the first and second capacitors are formed on a flexible printed circuit.

12. The display driving integrated circuit of claim 1, each of the plurality of control switches and the first to third mode switches is connected to each of the first and second capacitors through at least one transparent electrode.

13. A display driving integrated circuit comprising:
a signal generator configured to generate a first switching signal and a second switching signal being complementary to the first switching signal; and
a charge pump comprising at least one diode, at least one capacitor, at least one mode switch, and at least one control switch, and configured to generate an output voltage by controlling the at least one mode switch, and the at least one control switch in response to the first and second switching signals,
wherein if the charge pump operates in a first mode, the charge pump is configured to form a first current path being via some of the at least one diode in response to the first and second switching signals to charge the at least one capacitor through the first current path, and if the charge pump operates in a second mode, the charge pump is configured to form a second current path not being via the at least one diode in response to the first and second switching signals to charge the at least one capacitor to charge the at least one capacitor through the second current path.

14. The display driving integrated circuit of claim 13, wherein the at least one diode includes a first diode, a second diode, and a third diode connected in series,
wherein the at least one mode switch includes a first mode switch, a second mode switch, and a third mode switch connected in series, one terminal of each of the first, second, and third mode switches being connected to an output terminal of each of the first, second, and third diodes, respectively, and
wherein the at least one capacitor includes a first capacitor connected between an output terminal of the first diode and a first part of the at least one control switch, and a second capacitor connected between an output terminal of the second diode and a second part of the at least one control switch.

15. The display driving integrated circuit of claim 14, wherein the first part of the at least one control switch comprises a first control switch connected between the a first terminal providing a second voltage and the first capacitor, and a second control switch connected between a second terminal providing a first voltage and the first capacitor; and
wherein the second part of the at least one control switch comprises a third control switch connected between the second terminal and the second capacitor, and a fourth control switch connected between the first terminal and the second capacitor.

16. The display driving integrated circuit of claim 15, wherein the first and third control switches are configured to operate in response to the first switching signal, and the second and fourth control switches are configured to operate in response to the second switching signal.

17. The display driving integrated circuit of claim 15, wherein, if the charge pump operates in the first mode, the first to third mode switches are disable in the first mode, and
wherein, if the charge pump operates in the second mode, the first and third mode switches are configured to operate in response to the first switching signal and the second mode switch is configured to operate in response to the second switching signal.

18. The display driving integrated circuit of claim 13, further comprising:
a gate driver configured to generate gate signals based on the output voltage, the gate signals being provided to an external display panel.

19. The display driving integrated circuit of claim 18, wherein the charge pump operates in one of the first mode and the second mode based on a size of the external display panel.

20. A display system comprising:
a display panel including a plurality of gate lines, a plurality of data lines, and a plurality of pixels connected to the plurality of gate lines and the plurality of data lines, respectively; and
a display driving integrated circuit configured to drive the display panel;
wherein the display driving integrated circuit comprises:
a signal generator configured to generate a first switching signal and a second switching signal being complementary to the first switching signal; and
a charge pump configured to change a first voltage from an external power source to generate an output voltage in response to the first and second switching signals and operate in one of low-current mode and high-current mode,
wherein the charge pump comprises:
a first diode, a second diode, and a third diode connected in series;
a plurality of control switches configured to selectively output one of the first voltage and a second voltage in response to the first and second switching signals;

a first capacitor connected between an output terminal of the first diode and a first part of the plurality of control switches;

a second capacitor connected between an output terminal of the second diode and a second part of the plurality of control switches; and a first mode switch, a second mode switch, and a third mode switch connected in series, one terminal of each of the first, second, and third mode switches connected to an output terminal of each of the first, second, and third diodes, respectively, and wherein, in response to the charge pump operating in the high-current mode, the first, second, and third switches are disabled to maintain a turn-off state.

* * * * *